(12) United States Patent
Nakagami et al.

(10) Patent No.: US 12,525,894 B2
(45) Date of Patent: Jan. 13, 2026

(54) AC/DC CONVERTER, ELECTRIC MOTOR DRIVE DEVICE AND REFRIGERATION CYCLE DEVICE

(71) Applicant: Mitsubishi Electric Corporation, Tokyo (JP)

(72) Inventors: Hiroyuki Nakagami, Tokyo (JP); Hiroki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 18/255,157

(22) PCT Filed: Mar. 1, 2021

(86) PCT No.: PCT/JP2021/007688
§ 371 (c)(1),
(2) Date: May 31, 2023

(87) PCT Pub. No.: WO2022/185374
PCT Pub. Date: Sep. 9, 2022

(65) Prior Publication Data
US 2024/0007018 A1    Jan. 4, 2024

(51) Int. Cl.
*H02P 27/06* (2006.01)
*F25B 31/02* (2006.01)
(Continued)

(52) U.S. Cl.
CPC .............. *H02M 7/219* (2013.01); *F25B 31/02* (2013.01); *H02M 1/0009* (2021.05);
(Continued)

(58) Field of Classification Search
CPC .... H02M 1/32; H02M 1/0009; H02M 5/4585; H02M 7/219; H02M 1/088; H02M 3/07;
(Continued)

(56) References Cited

U.S. PATENT DOCUMENTS 8,498,136 B2    7/2013  Shinomoto et al.
9,628,003 B2*   4/2017  Shinomoto ......... H02M 7/2176
(Continued)

FOREIGN PATENT DOCUMENTS

JP    2005-160214 A   6/2005
WO    2009/028053 A1  3/2009
WO    2015/063869 A1  5/2015

OTHER PUBLICATIONS

International Search Report of the International Searching Authority mailed Apr. 27, 2021 for the corresponding International Application No. PCT/JP2021/007688 (and English translation).

*Primary Examiner* — Thai T Dinh
(74) *Attorney, Agent, or Firm* — Posz Law Group, PLC (57) ABSTRACT

An AC/DC converter includes: a charge accumulation unit including first and second capacitors connected in series; a switching unit including a switch unit; a control unit; a switch drive unit; and first current and second current detection units. The switch unit includes first and second switching elements connected in series. The switching unit switches between charging and non-charging of each of the first and second capacitors. The switch drive unit causes the first and second switching elements to perform an ON/OFF operation exclusively to each other. A current detector of the first current detection unit is disposed between a rectifier circuit and the switch unit. The control unit detects a current flowing through the switch unit on the basis of based on a difference value between a detection value of a first current detected by the first current detection unit and a detection value of a second current detected by the second current detection unit.

9 Claims, 6 Drawing Sheets

(51) Int. Cl.
  *H02M 1/00*  (2006.01)
  *H02M 1/088*  (2006.01)
  *H02M 1/32*  (2007.01)
  *H02M 5/458*  (2006.01)
  *H02M 7/219*  (2006.01)

(52) U.S. Cl.
  CPC ............ *H02M 1/088* (2013.01); *H02M 1/32* (2013.01); *H02M 5/4585* (2013.01); *H02P 27/06* (2013.01); *F25B 2600/021* (2013.01)

(58) Field of Classification Search
  CPC ...... H02P 27/06; H02P 2201/07; H02P 6/085; F25B 31/02; F25B 2600/021; F25B 2600/024
  See application file for complete search history.

(56) References Cited

U.S. PATENT DOCUMENTS

| | | | |
|---|---|---|---|
| 9,800,077 B2* | 10/2017 | Hatakeyama | H02M 7/487 |
| 9,816,737 B2* | 11/2017 | Kamiya | H02M 1/36 |
| 2016/0245571 A1* | 8/2016 | Shinomoto | H02M 1/36 |
| 2016/0248352 A1* | 8/2016 | Shinomoto | H02K 1/27 |
| 2016/0265822 A1* | 9/2016 | Kamiya | H02M 1/12 |
| 2019/0149035 A1* | 5/2019 | Kubouchi | H02M 1/32 323/271 |

* cited by examiner

AC/DC CONVERTER, ELECTRIC MOTOR DRIVE DEVICE AND REFRIGERATION CYCLE DEVICE

CROSS REFERENCE TO RELATED APPLICATION

This application is a U.S. national stage application of PCT/JP2021/007688 filed on Mar. 1, 2021, the contents of which are incorporated herein by reference.

FIELD

The present disclosure relates to an alternating current/direct current (AC/DC) converter for converting an alternating current into a direct current, an electric motor drive device, and a refrigeration cycle device.

BACKGROUND

Patent Literature 1 below discloses an AC/DC converter to be used for a refrigeration cycle device. In this type of AC/DC converter, an excessive inrush current may flow through one or both of two switching elements at a time of starting or restarting the device. If an excessive inrush current flows through the switching element, the switching element may be damaged. Therefore, in Patent Literature 1, detection values of four current detectors are input to a control unit, and the control unit controls a switching operation of the switching elements, thereby preventing damage to the switching elements.

CITATION LIST

Patent Literature

Patent Literature 1: International Publication No. 2015/063869

SUMMARY OF INVENTION

Problem to be Solved by the Invention

However, in the above-described conventional technique, the number of current detectors is as large as four, and there is a problem in that a manufacturing cost of the device increases.

Note that, if the number of current detectors is reduced, the manufacturing cost is reduced, but deterioration in performance is concerned. Whereas, even in a refrigeration cycle device having a large current rating, the manufacturing cost of the device can be reduced if a current detector corresponding to less than the current rating can be used. By adopting such an approach, it is possible to reduce the manufacturing cost while reducing or preventing the deterioration in performance.

Further, in refrigeration cycle devices, there are a wide variety of products having different current ratings. Therefore, a configuration of the device can be standardized if a configuration is adopted in which a current detector to be used can be selected for each model among a plurality of models of products having different current ratings, even when the number of current detectors increases. By adopting such an approach, a manufacturing cost per model including a design cost can be reduced, and an intended purpose can be achieved.

The present disclosure has been made in view of the above, and an object thereof is to provide an AC/DC converter capable of reducing a manufacturing cost per model while reducing or preventing deterioration in performance.

Means to Solve the Problem

In order to solve the above-described problems and achieve the object, an alternating current/direct current (AC/DC) converter according to the present disclosure is an AC/DC converter for converting an input AC voltage into a DC voltage and applying the DC voltage to an inverter that drives an electric motor. The AC/DC converter includes: a rectifier circuit that rectifies an AC voltage; a charge accumulation unit including first and second capacitors connected in series; a switching unit including a switch unit; a control unit; a switch drive unit; a first current detection unit; and a second current detection unit. The switch unit includes first and second switching elements connected in series. The switching unit is disposed between the rectifier circuit and the charge accumulation unit and connected in parallel to each of the rectifier circuit and the charge accumulation unit, and switches between charging and non-charging of the first and second capacitors. The control unit generates a control signal for controlling a switching operation of the first and second switching elements. The switch drive unit applies a drive signal generated on the basis of the control signal output from the control unit, to cause the first and second switching elements to perform an ON/OFF operation exclusively to each other. The first current detection unit detects a first current flowing into and out of the switch unit. The second current detection unit detects a second current flowing into and out of the inverter. A detector of the first current detection unit is disposed between the rectifier circuit and the switch unit. The control unit detects a current flowing through the switch unit on the basis of a difference value between a detection value of the first current and a detection value of the second current.

Effects of the Invention

According to the AC/DC converter according to the present disclosure, there is an effect of being able to reduce a manufacturing cost per model while reducing or preventing deterioration in performance.

DESCRIPTION OF EMBODIMENTS

Hereinafter, an AC/DC converter, an electric motor drive device, and a refrigeration cycle device according to embodiments of the present disclosure will be described in detail with reference to the accompanying drawings. Note that, hereinafter, physical connection and electrical connection will not be distinguished from each other, and will be simply referred to as "connection". That is, the term "connection" includes both a configuration where components are directly connected to each other and a configuration where components are indirectly connected to each other via another component.

First Embodiment

Figure 1:
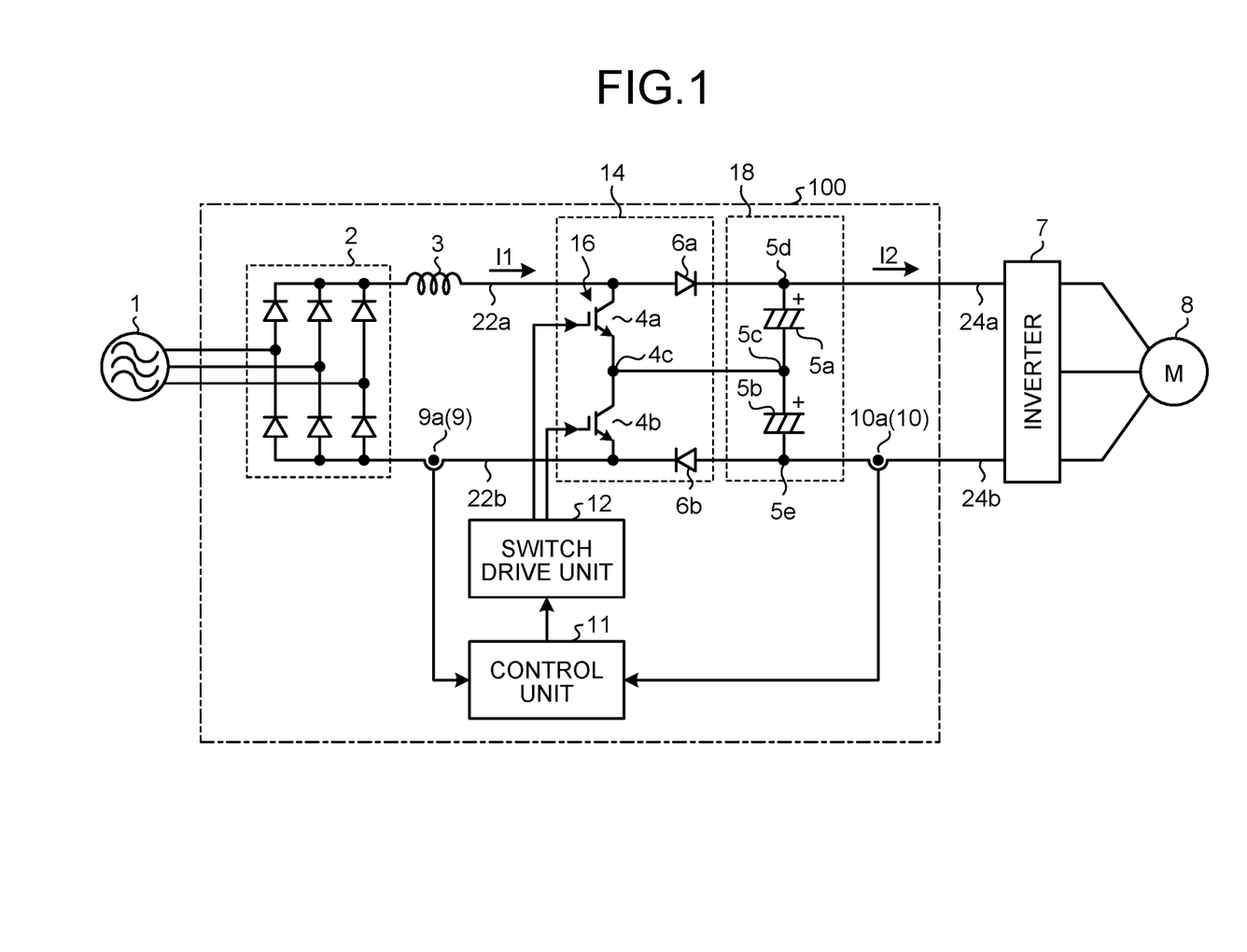
FIG. 1 is a circuit diagram illustrating a configuration example of an AC/DC converter according to a first embodiment.

FIG. 1 is a circuit diagram illustrating a configuration example of an AC/DC converter 100 according to a first embodiment. The AC/DC converter 100 according to the first embodiment is connected between an AC power supply 1 and an inverter 7. The AC/DC converter 100 converts an input AC voltage into a DC voltage, and applies the changed DC voltage to the inverter 7. The AC voltage is an AC input voltage applied from the AC power supply 1 to the AC/DC converter 100. This input voltage is also referred to as a "power supply voltage". The inverter 7 converts the input DC voltage into an AC voltage for an electric motor 8, to drive the electric motor 8. The AC/DC converter 100 and the inverter 7 constitute an electric motor drive device.

An example of the electric motor 8 is an electric motor for drive of a compressor to be used in a refrigeration cycle device. Examples of the refrigeration cycle device include an air conditioner, a freezing machine, a washing dryer, a refrigerator, a dehumidifier, a heat pump water heater, and a showcase. Note that, without limiting to the refrigeration cycle device, the electric motor 8 may be an electric motor to be used in a vacuum cleaner, a fan motor, a ventilator, a hand dryer, an induction heating electromagnetic cooking device, and the like.

The AC/DC converter 100 includes a rectifier circuit 2, a reactor 3, a switching unit 14, a charge accumulation unit 18, a first current detection unit 9, a second current detection unit 10, a control unit 11, and a switch drive unit 12. The switching unit 14 is disposed between the rectifier circuit 2 and the charge accumulation unit 18. That is, the switching unit 14 is connected in parallel to each of the rectifier circuit 2 and the charge accumulation unit 18.

The switching unit 14 includes a first switching element 4a, a second switching element 4b, a first backflow prevention element 6a, and a second backflow prevention element 6b. The charge accumulation unit 18 includes a first capacitor 5a and a second capacitor 5b. In the charge accumulation unit 18, the first capacitor 5a and the second capacitor 5b are connected in series. A series circuit of the first switching element 4a and the second switching element 4b constitutes a switch unit 16.

In the switching unit 14, the first switching element 4a operates to switch between charging and non-charging of the second capacitor 5b. Further, the second switching element 4b operates to switch between charging and non-charging of the first capacitor 5a.

FIG. 1 illustrates a case where the first and second switching elements 4a and 4b are insulated gate bipolar transistors (IGBTs), but the present disclosure is not limited to the IGBTs. Instead of the IGBT, a metal oxide semiconductor field effect transistor (MOSFET) may be used.

The rectifier circuit 2 is a three-phase full-wave rectifier circuit in which six rectifier diodes are connected in full-bridge configuration. Instead of the three-phase full-wave rectifier circuit, a full-wave rectifier circuit in which four rectifier diodes are connected in bridge configuration may be used. Note that the AC power supply 1 in this case is a single-phase AC power supply. The rectifier circuit 2 rectifies an AC voltage output from the AC power supply 1. The reactor 3 is connected between the rectifier circuit 2 and the switching unit 14 on an output end of the rectifier circuit 2. Note that, instead of the configuration of FIG. 1, a configuration may be adopted in which the reactor 3 is connected to an input end of the rectifier circuit 2.

In the switching unit 14, a connection point 4c between the first switching element 4a and the second switching element 4b constitutes a midpoint of the switch unit 16. Further, in the charge accumulation unit 18, a connection point 5c between the first capacitor 5a and the second capacitor 5b constitutes a midpoint of the charge accumulation unit 18. The connection point 5c is connected to the connection point 4c. Note that, in this document, in order to discriminate between the midpoint of the switch unit 16 and the midpoint of the charge accumulation unit 18, the midpoint of the switch unit 16 may be referred to as a "first midpoint", and the midpoint of the charge accumulation unit 18 may be referred to as a "second midpoint".

The first and second backflow prevention elements 6a and 6b are disposed between the switch unit 16 and the charge accumulation unit 18. In the charge accumulation unit 18, the first capacitor 5a is connected to a cathode of the first backflow prevention element 6a at a connection point 5d. The second capacitor 5b is connected to an anode of the second backflow prevention element 6b at a connection point 5e. An anode of the first backflow prevention element 6a is connected to a collector of the first switching element 4a. A cathode of the second backflow prevention element 6b is connected to an emitter of the second switching element 4b. That is, the first backflow prevention element 6a is connected between the collector of the first switching element 4a and the connection point 5d in a forward direction toward the connection point 5d, and the second backflow prevention element 6b is connected between the emitter of the second switching element 4b and the connection point 5e in a forward direction toward the emitter of the second switching element 4b.

The first switching element 4a performs an operation of switching between charging and non-charging of the second capacitor 5b. The second switching element 4b performs an operation of switching between charging and non-charging of the first capacitor 5a. The first backflow prevention element 6a performs an operation of preventing backflow of charges accumulated in the first capacitor 5a to the first switching element 4a. The second backflow prevention element 6b performs an operation of preventing backflow of charges accumulated in the second capacitor 5b to the second switching element 4b.

The control unit 11 generates a control signal for controlling the switching operation of the first and second switching elements 4a and 4b, and outputs the control signal to the switch drive unit. The switch drive unit 12 generates a drive signal for driving the first and second switching elements 4a and 4b on the basis of the control signal. The switch drive unit 12 applies the generated drive signal to gates of the first and second switching elements 4a and 4b, and causes the first and second switching elements 4a and 4b to perform an ON/OFF operation exclusively to each other. Note that, by the first and second switching elements 4a and 4b repeating the ON/OFF operation exclusively to each other, a voltage that is twice a rectified voltage can be generated in the charge accumulation unit 18. This operation is called a boosting operation. The rectified voltage is an output voltage of the rectifier circuit 2.

The first current detection unit 9 includes a current detector 9a, and the second current detection unit includes a current detector 10a. The current detector 9a is disposed between the rectifier circuit 2 and the switch unit 16, and the current detector 10a is disposed between the charge accumulation unit 18 and the inverter 7.

Examples of the current detectors 9a and 10a include a configuration in which a current is detected using a current transformer (CT) or a shunt resistor. The current detector 9a detects a first current I1 flowing into and out of the switch unit 16. The first current I1 is a current flowing between the rectifier circuit 2 and the switch unit 16, and a direction of the illustrated arrow is defined as positive. The first current I1 is also a current flowing through the reactor 3. The current detector 10a detects a second current I2 flowing into and out of the inverter 7. The second current I2 is a current flowing between the charge accumulation unit 18 and the inverter 7, and a direction of the illustrated arrow is defined as positive.

A detection value of the first current I1 obtained by the current detector 9a and a detection value of the second current I2 obtained by the current detector 10a are input to the control unit 11. The control unit 11 generates a control signal for the above-described boosting operation. In addition, the control unit 11 determines whether or not an overcurrent is flowing through the switch unit 16, on the basis of the detection values of the first current I1 and the second current I2. This process will be described later.

Note that, FIG. 1 illustrates a configuration in which the current detector 9a is disposed on connection wiring 22b on a low potential side between the rectifier circuit 2 and the switch unit 16, but the present disclosure is not limited to this configuration. A configuration may be adopted in which the current detector 9a is disposed on connection wiring 22a on a high potential side between the rectifier circuit 2 and the switch unit 16. In this configuration, the current detector 9a may be disposed between the rectifier circuit 2 and the reactor 3, or between the reactor 3 and the switch unit 16. In addition, FIG. 1 illustrates a configuration in which the current detector 10a is disposed on connection wiring 24b on a low potential side between the charge accumulation unit 18 and the inverter 7, but the present disclosure is not limited to this configuration. A configuration may be adopted in which the current detector 10a is disposed on connection wiring 24a on a high potential side between the charge accumulation unit 18 and the inverter 7.

Figure 2:
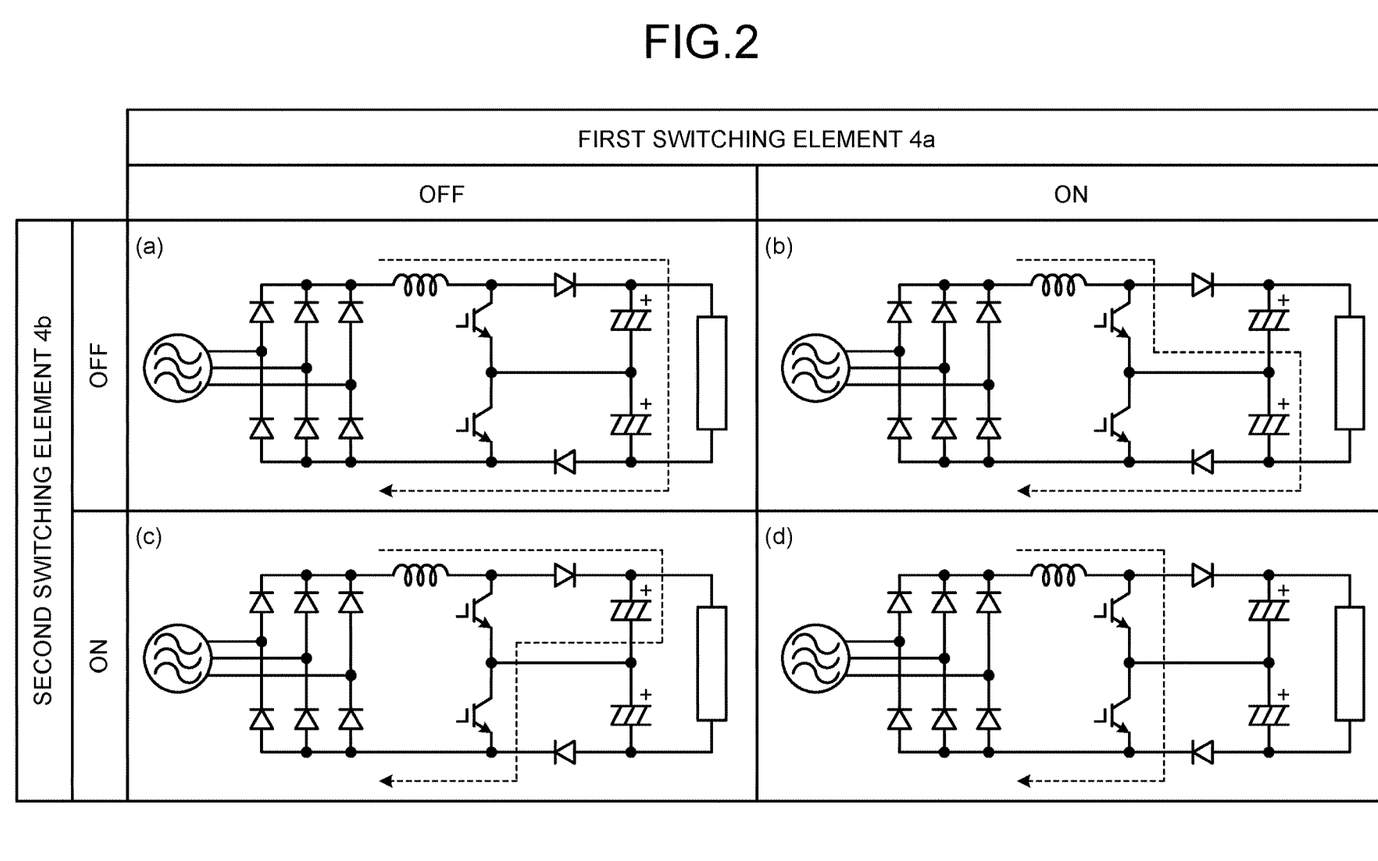
FIG. 2 is a diagram illustrating a relationship between a switching operation of first and second switching elements and a current path in the AC/DC converter according to the first embodiment.

Next, with reference to FIGS. 1 and 2, switching control of the first and second switching elements 4a and 4b by the control unit 11 will be described. FIG. 2 is a diagram illustrating a relationship between a switching operation of the first and second switching elements 4a and 4b and a current path in the AC/DC converter 100 according to the first embodiment. Note that, in FIG. 2, reference numerals of individual components are omitted for simplification of the drawing.

FIG. 2(a) illustrates a state in which both the first and second switching elements 4a and 4b are controlled to be turned OFF. In this state (a), while no current flows through the first and second switching elements 4a and 4b, a current flows through the first and second capacitors 5a and 5b, and both the first and second capacitors 5a and 5b are charged.

FIG. 2(b) illustrates a state in which the first switching element 4a is controlled to be turned ON and the second switching element 4b is controlled to be turned OFF. In the state of (b), no current flows through the second switching element 4b, and only the second capacitor 5b is charged.

FIG. 2(c) illustrates a state in which the first switching element 4a is controlled to be turned OFF and the second switching element 4b is controlled to be turned ON. In the state of (c), no current flows through the first switching element 4a, and only the first capacitor 5a is charged.

FIG. 2(d) illustrates a state in which both the first and second switching elements 4a and 4b are controlled to be turned ON. In the state of (d), a current flows through both the first and second switching elements 4a and 4b, and no current flows through the first and second capacitors 5a and 5b. Therefore, both the first and second capacitors 5a and 5b are not charged.

As illustrated in FIG. 2(d), when the first and second switching elements 4a and 4b are simultaneously turned ON, a large current short-circuiting the power supply voltage flows through the reactor 3. Therefore, at the time of driving the first and second switching elements 4a and 4b, the first and second switching elements 4a and 4b are switched between ON and OFF exclusively to each other so that the first and second switching elements 4a and 4b are not simultaneously turned ON. That is, when one switching element is turned ON, another switching element is always turned OFF.

Next, a description will be made on the fact that the first current detection unit 9 and the second current detection unit 10 can detect the first current I1 and the second current I2 under any operation condition of the first and second switching elements 4a and 4b.

First, the state becomes any one of the states (a) to (c) during normal control. In any state, the first current I1 always flows through the first current detection unit 9, and the second current I2 always flows through the second current detection unit 10. Therefore, the first current detection unit 9 can detect the first current I1, and the second current detection unit 10 can detect the second current I2.

In addition, when the first and second switching elements 4a and 4b are controlled exclusively to each other, the state of (d) is not established. Whereas, when there occurs a shift in a timing of exclusive control by the control unit 11, or when at least one of the first and second switching elements 4a and 4b has a short-circuit fault, the state of (d) can be established. In this case, a short-circuit current flows through the first and second switching elements 4a and 4b, and this short-circuit current becomes the first current I1. Further, when the inverter 7 is operating, the electric motor 8 is driven by electric power accumulated in the charge accumulation unit 18. At this time, the second current I2 flows through the second current detection unit 10. Therefore, the second current detection unit 10 can detect the second current I2.

As described above, the first current detection unit 9 and the second current detection unit 10 can detect the first current I1 and the second current I2 under any operation condition of the first and second switching elements 4a and 4b.

Note that, as described above, when the state (d) is established, a large short-circuit current flows, and either or both of the first and second switching elements 4a and 4b may be damaged. Therefore, the control unit 11 calculates a difference value between a detection value of the first current I1 and a detection value of the second current I2, and determines whether or not the current flowing through the switch unit 16 is an overcurrent on the basis of the calculated difference value. The difference value represents a current flowing through the switch unit 16. That is, the control unit 11 can detect currents flowing through the first and second switching elements 4a and 4b on the basis of the difference value between the detection value of the first current I1 and the detection value of the second current I2.

When an overcurrent is detected by the control unit 11, the control unit 11 generates a stop signal for stopping the operation of the first and second switching elements 4a and 4b, and outputs the stop signal to the switch drive unit 12. The switch drive unit 12 having received the stop signal stops the switching operation of the first and second switching elements 4a and 4b. This control makes it possible to prevent damage to the first and second switching elements 4a and 4b, or can prevent further damage to the first switching element 4a or the second switching element 4b.

In addition to the above determination process, a function of determining the overcurrent may be provided to the first current detection unit 9 in order to more quickly detect the overcurrent. Specifically, when the detection value of the first current I1 is greater than or equal to a preset threshold value, or when the detection value exceeds the threshold value, the first current detection unit 9 transmits, to the control unit 11, a signal or a signal pulse indicating that an overcurrent has flowed through the switch unit 16. When the switch drive unit 12 receives the overcurrent detection signal from the first current detection unit 9, the switch drive unit 12 stops the switching operation of the first and second switching elements 4a and 4b. This control makes it possible to more quickly perform the process of preventing damage to the first and second switching elements 4a and 4b.

Note that the second current detection unit 10 may also be provided with a similar determination function. Specifically, when the detection value of the second current I2 is greater than or equal to a preset threshold value, or when the detection value exceeds the threshold value, the second current detection unit 10 transmits, to the control unit 11, a signal or a signal pulse indicating that an overcurrent has flowed through the inverter 7. Although not illustrated in FIG. 1, when the switch drive unit 12 receives the overcurrent detection signal from the second current detection unit 10, the switch drive unit 12 performs a process of stopping a switching operation of a switching element (not illustrated) included in the inverter 7. This control can prevent damage to the switching element (not illustrated) included in the inverter 7.

As described above, the AC/DC converter according to the first embodiment includes: the charge accumulation unit including the first and second capacitors connected in series; the switching unit including the switch unit; the first current detection unit; and the second current detection unit. The switch unit includes first and second switching elements connected in series. The switching unit switches between charging and non-charging of each of the first and second capacitors. The switch drive unit causes the first and second switching elements to perform the ON/OFF operation exclusively to each other. The detector of the first current detection unit is disposed between the rectifier circuit and the switch unit. The detector of the second current detection unit is disposed between the charge accumulation unit and the inverter. The control unit detects a current flowing through the switch unit on the basis of a difference value between a detection value of the first current detected by the first current detection unit and a detection value of the second current detected by the second current detection unit. As described above, the AC/DC converter according to the first embodiment can detect a current flowing through the switch unit, without a current detector provided in the switch unit. In addition, the number of current detectors can be reduced as compared with the related art. This makes it possible to reduce the manufacturing cost while reducing or preventing deterioration in performance.

Figure 3:
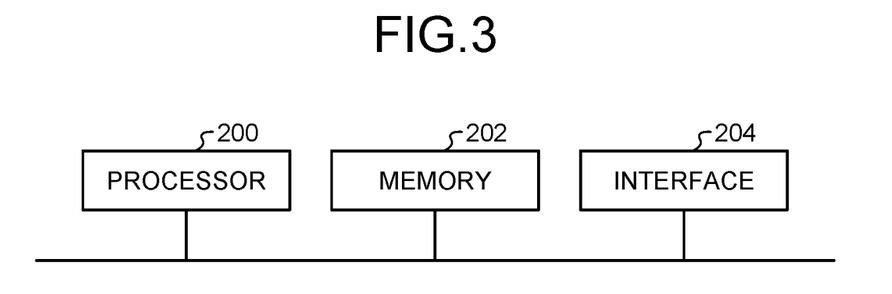
FIG. 3 is a block diagram illustrating an example of a hardware configuration that implements functions of a control unit according to the first embodiment.
Figure 4:
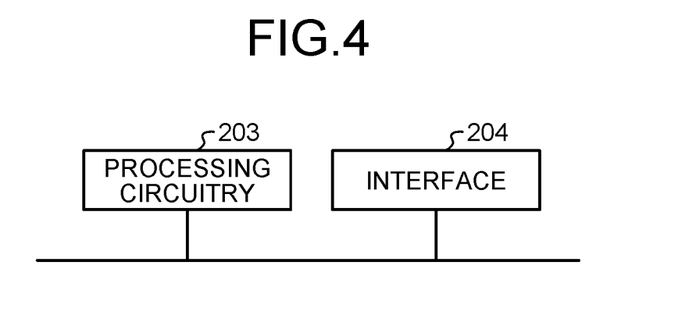
FIG. 4 is a block diagram illustrating another example of a hardware configuration that implements functions of the control unit according to the first embodiment.

Next, with reference to FIGS. 3 and 4, a hardware configuration that implements the functions of the control unit 11 according to the first embodiment will be described. FIG. 3 is a block diagram illustrating an example of a hardware configuration that implements the functions of the control unit 11 according to the first embodiment. FIG. 4 is a block diagram illustrating another example of a hardware configuration that implements the functions of the control unit 11 according to the first embodiment.

When some or all of the functions of the control unit 11 according to the first embodiment are implemented, as illustrated in FIG. 3, a configuration may be adopted including a processor 200 that performs arithmetic operation, a memory 202 that stores a program to be read by the processor 200, and an interface 204 that inputs and outputs signals.

The processor 200 may be an arithmetic means referred to as an arithmetic device, a microprocessor, a microcomputer, a central processing unit (CPU), or a digital signal processor (DSP). Further, examples of the memory 202 can include a nonvolatile or volatile semiconductor memory such as a random access memory (RAM), a read only memory (ROM), a flash memory, an erasable programmable ROM (EPROM), or an electrically EPROM (EEPROM, registered trademark), a magnetic disk, a flexible disk, an optical disk, a compact disk, a mini disk, and a digital versatile disc (DVD).

The memory 202 stores a program for executing the functions of the control unit 11 in the first embodiment. The processor 200 exchanges necessary information via the interface 204, and the above-described processing can be performed by the processor 200 executing a program stored in the memory 202. An operation result by the processor 200 can be stored in the memory 202.

In addition, when some of the functions of the control unit 11 in the first embodiment are implemented, processing circuitry 203 illustrated in FIG. 4 can also be used. The processing circuitry 203 corresponds to a single circuit, a composite circuit, an application specific integrated circuit (ASIC), a field-programmable gate array (FPGA), or a combination of these. Information input to the processing circuitry 203 and information output from the processing circuitry 203 can be obtained via the interface 204.

Note that some of the processing in the control unit 11 may be performed by the processing circuitry 203, and processing that is not performed by the processing circuitry 203 may be performed by the processor 200 and the memory 202.

Second Embodiment

Figure 5:
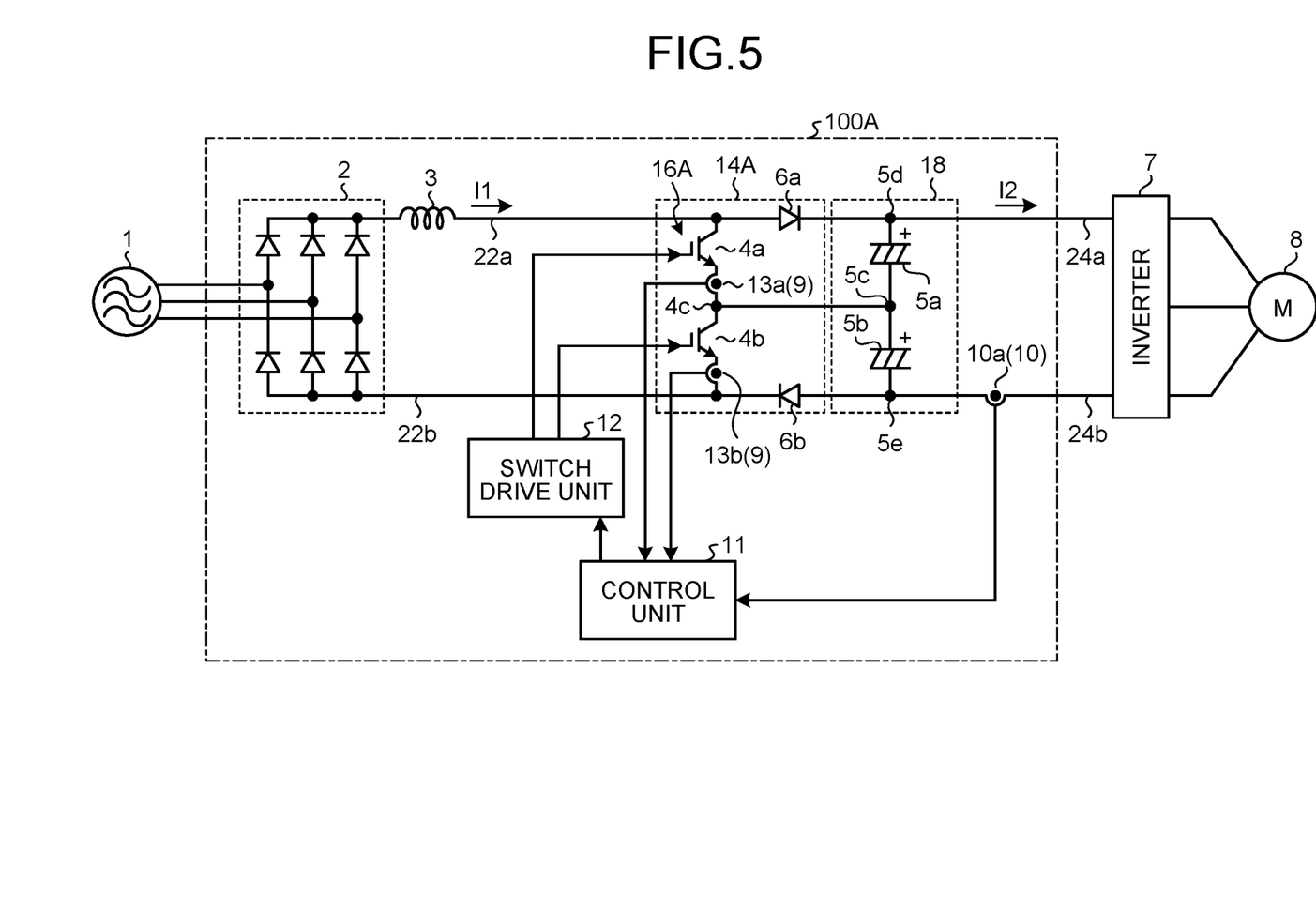
FIG. 5 is a circuit diagram illustrating a configuration example of an AC/DC converter according to a second embodiment.

FIG. 5 is a circuit diagram illustrating a configuration example of an AC/DC converter 100A according to a second embodiment. In FIG. 5, the switching unit 14 illustrated in FIG. 1 is replaced with a switching unit 14A, and the switch unit 16 is replaced with a switch unit 16A. In addition, the current detector 9a constituting the first current detection unit 9 is removed from the configuration illustrated in FIG. 1. Instead, a current detector 13a is provided on an emitter side of the first switching element 4a, that is, on a current outflow side. In addition, a current detector 13b is provided on an emitter side of the second switching element 4b, that is, on a current outflow side. The current detectors 13a and 13b are components of the first current detection unit 9. The AC/DC converter 100A and the inverter 7 constitute an electric motor drive device. Other configurations are identical or equivalent to those of the AC/DC converter 100 illustrated in FIG. 1, and the identical or equivalent components are denoted by the identical reference numerals, and redundant description is omitted.

Also in the circuit configuration of FIG. 5, the relationship between the switching operation and the current path illustrated in FIG. 2 is similarly applied. In FIGS. 2(b) to 2(d), a current flows through at least one of the current detectors 13a and 13b in any case. Therefore, the current flowing through the switch unit 16A can be detected by at least one of the current detectors 13a and 13b.

Further, FIG. 2(a) illustrates a mode that does not occur when the first and second switching elements 4a and 4b are subjected to ON/OFF control exclusively to each other. Therefore, in the operation of the AC/DC converter 100A described in the second embodiment, current detection in the mode of FIG. 2(a) is unnecessary.

In the description of the second embodiment, several symbols will be used for the description. Each symbol and a definition thereof are as follows.

$I_{dc}$: a current value of the first current I1
$I_{rmsMAX}$: an effective value of a maximum current that can flow in first and second current detectors
$T_{on}$: ON time per control cycle of the first and second switching elements 4a and 4b
$T_{off}$: OFF time per control cycle of the first and second switching elements 4a and 4b Note that, since the first and second switching elements 4a and 4b are subjected to the ON/OFF control exclusively to each other, one control cycle is "$T_{on}+T_{off}$".

The current value $I_{dc}$ is equal to a current value detected by the current detector 9a in the first embodiment. Whereas, an effective value of a current flowing through the current detectors 13a and 13b in the second embodiment is smaller than the current value $I_{dc}$. Therefore, the effective value $I_{rmsMAX}$ of the maximum current that can flow to the current detectors 13a and 13b can be made smaller than that of the current detector 9a of the first embodiment. The reason will be described below.

Here, a situation is considered in which each of the first and second switching elements 4a and 4b is continuously driven with the ON time $T_{on}$ and the OFF time $T_{off}$ per control cycle. At this time, a current flowing through the first and second switching elements 4a and 4b is a current proportional to on-duty of the "$T_{on}/(T_{on}+T_{off})$". Therefore, there is a relationship represented by the following Formula (1) between the effective value $I_{rmsMAX}$ of the maximum current and the current value $I_{dc}$.

$$I_{dc} \geq I_{rmsMAX} \geq \sqrt{\{T_{on}/(t_{on}+T_{off})\}} \times D_{dc} \tag{1}$$

When the first and second capacitors 5a and 5b of the charge accumulation unit 18 are uniformly charged, a ratio between the ON time $T_{on}$ and the OFF time $T_{off}$ is "1:1". At this time, a coefficient of $I_{dc}$ on the right side of the above Formula (1) is $\sqrt{(1/2)} \approx 0.7$. Therefore, for the current detectors 13a and 13b according to the second embodiment, current detectors can be used in which the effective value $I_{rmsMAX}$ of the maximum current is about 30% lower than that of the current detector 9a according to the first embodiment.

When the AC/DC converter 100A according to the second embodiment is used for application to a refrigeration cycle device having a large current rating, a current detector less than the current rating can be used. Similarly to the AC/DC converter 100 according to the first embodiment, the AC/DC converter 100A according to the second embodiment can obtain a detection value of a current necessary for control under any operation condition of the first and second switching elements 4a and 4b. This makes it possible to reduce the manufacturing cost of the device while reducing or preventing deterioration in performance.

Third Embodiment

Figure 6:
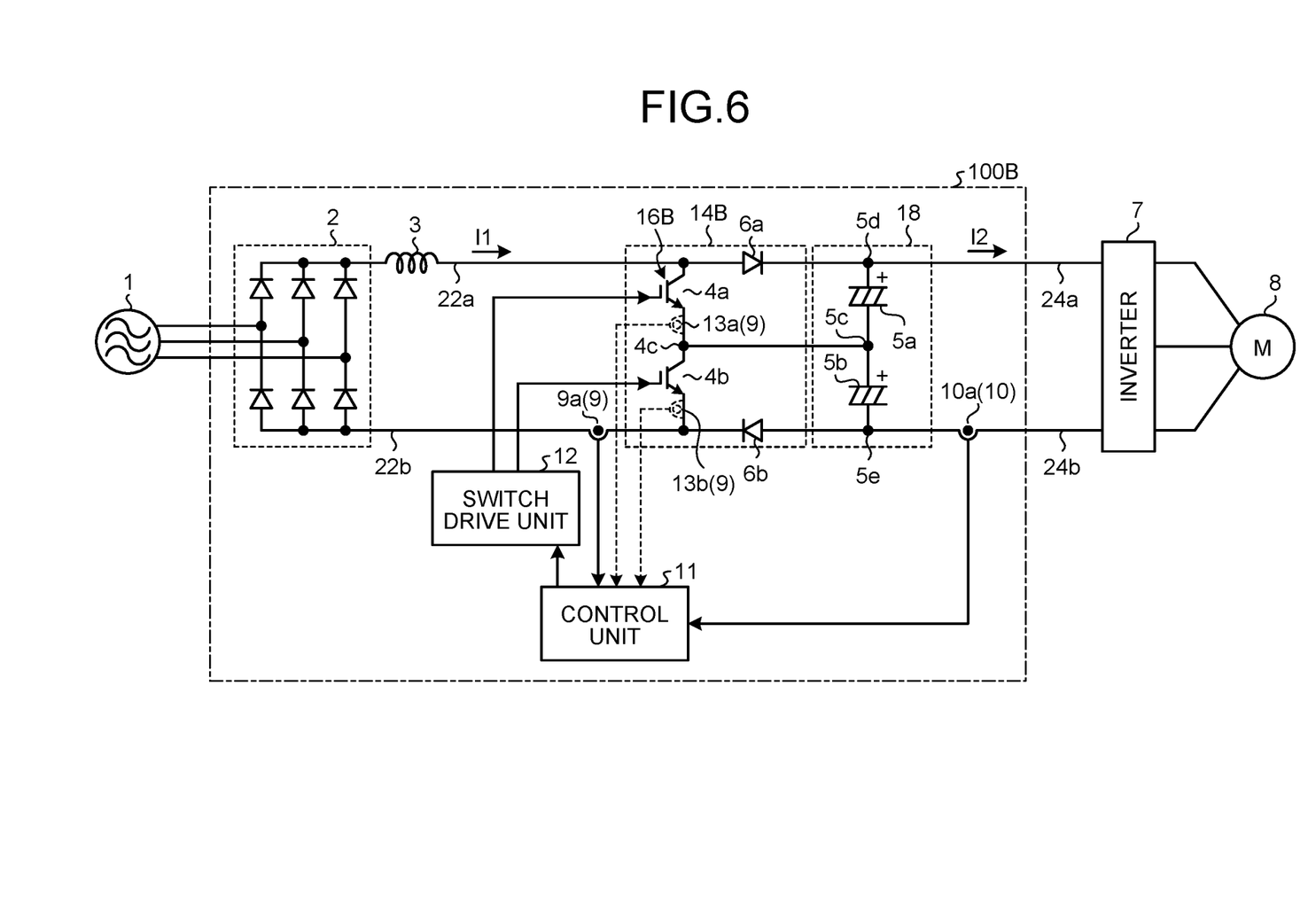
FIG. 6 is a circuit diagram illustrating a configuration example of an AC/DC converter according to a third embodiment.

FIG. 6 is a circuit diagram illustrating a configuration example of an AC/DC converter 100B according to a third embodiment. In FIG. 6, the switching unit 14 illustrated in FIG. 1 is replaced with a switching unit 14B, and the switch unit 16 is replaced with a switch unit 16B. In addition to the configuration illustrated in FIG. 1, the current detector 13a is provided on an emitter side of the first switching element 4a, that is, on a current outflow side. Furthermore, the current detector 13b is provided on an emitter side of the second switching element 4b, that is, on a current outflow side. The current detectors 13a and 13b are components of the first current detection unit 9 together with the current detector 9a. The AC/DC converter 100B and the inverter 7 constitute an electric motor drive device. Other configurations are identical or equivalent to those of the AC/DC converter 100 illustrated in FIG. 1, and the identical or equivalent components are denoted by the identical reference numerals, and redundant description is omitted.

While the current detectors each are provided at different positions in the first embodiment and the second embodiment, both circuit configurations can be adopted in the third embodiment. In the third embodiment, it is possible to select any one among the current detector 9a in the circuit configuration of the first embodiment and the current detectors 13a and 13b in the circuit configuration of the second embodiment, on an identical circuit. Hereinafter, a selection method thereof will be described. Note that, in the following description, the current detector 13a, the current detector 13b, and the current detector 9a are referred to as a "first current detector", a "second current detector", and a "third current detector", respectively. Note that, in the following description, performance of the first, second, and third current detectors is assumed to be equivalent, but the present disclosure is not limited thereto. The performance of the third current detector may be higher than the performance of the first and second current detectors.

Although not described in the first embodiment, there is a relationship represented by the following Formula (2) between the effective value $I_{rmsMAX}$ of the maximum current that can flow in the third current detector and the current value $I_{dc}$ of the first current I1.

$$I_{rmsMAX} \geq I_{dc} \tag{2}$$

Therefore, in the third embodiment, when at least the third current detector satisfies the relationship of the above Formula (2), the third current detector is selected as the detector of the first current detection unit 9. On the other hand, when the third current detector does not satisfy the relationship of the above Formula (2) and the first and second current detectors satisfy the relationship of the Formula (1), the first and second current detectors are selected as the detectors of the first current detection unit 9.

With the selection as described above, a circuit configuration is obtained in which the current detector of any of the first embodiment and the second embodiment can be used on one circuit. This makes it possible to use a current detector that matches a rated current of the device.

In refrigeration cycle devices, there are a wide variety of products having different current ratings. Therefore, a configuration of the device can be standardized if a configuration is adopted in which a current detector for use can be selected for each model among a plurality of models of products having different current ratings, even when the number of current detectors increases. By such an approach, a manufacturing cost per model including a design cost can be reduced. Therefore, according to the AC/DC converter of the third embodiment, it is possible to reduce the manufacturing cost per model while reducing or preventing deterioration in performance.

Fourth Embodiment

Figure 7:
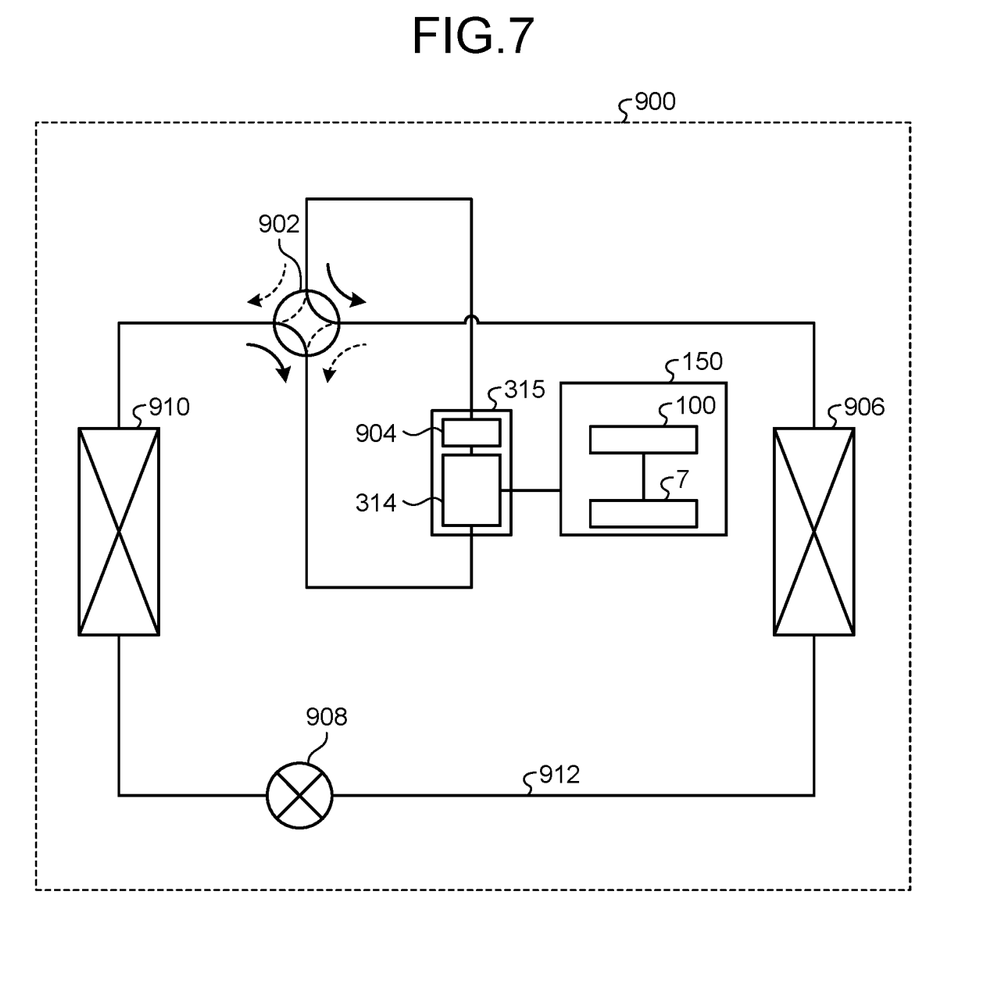
FIG. 7 is a diagram illustrating a configuration example of a refrigeration cycle device according to a fourth embodiment.

FIG. 7 is a view illustrating a configuration example of a refrigeration cycle device 900 according to a fourth embodiment. The refrigeration cycle device 900 according to the fourth embodiment includes an electric motor drive device 150 including the AC/DC converter 100 and the inverter 7 described in the first embodiment. The refrigeration cycle device 900 according to the fourth embodiment can be applied to a product including a refrigeration cycle, such as an air conditioner, a freezing machine, a washing dryer, a refrigerator, a dehumidifier, a heat pump water heater, or a showcase as described above. Note that, in FIG. 7, components having functions similar to those of the first embodiment are denoted by reference numerals identical to those of the first embodiment.

In the refrigeration cycle device 900, a compressor 315, a four-way valve 902, an indoor heat exchanger 906, an expansion valve 908, and an outdoor heat exchanger 910 are attached via a refrigerant pipe 912.

Inside the compressor 315, a compression mechanism 904 that compresses a refrigerant, and an electric motor 314 that operates the compression mechanism 904 are provided. The electric motor 314 corresponds to the electric motor 8 described in the first embodiment.

The refrigeration cycle device 900 can perform heating operation or cooling operation by a switching operation of the four-way valve 902. The compression mechanism 904 is driven by the electric motor 314 subjected to variable-speed control.

During the heating operation, as indicated by solid arrows, the refrigerant is pressurized and fed by the compression mechanism 904, and returns to the compression mechanism 904 through the four-way valve 902, the indoor heat exchanger 906, the expansion valve 908, the outdoor heat exchanger 910, and the four-way valve 902.

During the cooling operation, as indicated by broken arrows, the refrigerant is pressurized and fed by the compression mechanism 904, and returns to the compression mechanism 904 through the four-way valve 902, the outdoor heat exchanger 910, the expansion valve 908, the indoor heat exchanger 906, and the four-way valve 902.

During the heating operation, the indoor heat exchanger 906 acts as a condenser to release heat, and the outdoor heat exchanger 910 acts as an evaporator to absorb heat. During the cooling operation, the outdoor heat exchanger 910 acts as a condenser to release heat, and the indoor heat exchanger 906 acts as an evaporator to absorb heat. The expansion valve 908 decompresses and expands the refrigerant.

Note that the refrigeration cycle device 900 according to the fourth embodiment has been described as including the AC/DC converter 100 described in the first embodiment, but is not limited thereto. The refrigeration cycle device 900 may include the AC/DC converter 100A according to the second embodiment illustrated in FIG. 5, or include the AC/DC converter 100B according to the third embodiment illustrated in FIG. 6.

Further, the configurations illustrated in the above embodiments illustrate one example and can be combined with another known technique, and it is also possible to omit and change a part of the configuration without departing from the gist.

REFERENCE SIGNS LIST

1 AC power supply; 2 rectifier circuit; 3 reactor; 4a first switching element; 4b second switching element; 4c, 5c, 5d, 5e connection point; 5a first capacitor; 5b second capacitor; 6a first backflow prevention element; 6b second backflow prevention element; 7 inverter; 8 electric motor; 9 first current detection unit; 9a, 10a, 13a, 13b current detector; 10 second current detection unit; 11 control unit; 12 switch drive unit; 14, 14A, 14B switching unit; 16, 16A, 16B switch unit; 18 charge accumulation unit; 22a, 22b, 24a, 24b connection wiring; 100, 100A, 100B AC/DC converter; 150 electric motor drive device; 200 processor; 202 memory; 203 processing circuitry; 204 interface; 314 electric motor; 315 compressor; 900 refrigeration cycle device; 902 four-way valve; 904 compression mechanism; 906 indoor heat exchanger; 908 expansion valve; 910 outdoor heat exchanger; 912 refrigerant pipe.

The invention claimed is:

1. An alternating current/direct current (AC/DC) converter for converting an input AC voltage into a DC voltage and applying the DC voltage to an inverter that drives an electric motor, the AC/DC converter comprising:
   a rectifier circuit to rectify the AC voltage;
   a charge accumulation circuit including first and second capacitors connected in series;
   a switching circuit to switch between charging and non-charging of each of the first and second capacitors,
      the switching circuit including a switch circuit including first and second switching elements connected in series,
      a first connection point between the first switching element and the second switching element constituting a midpoint of the switch circuit is continuously connected to a second connection point between the first capacitor and the second capacitor that constitutes a midpoint of the charge accumulation circuit, and
      the switching circuit being disposed between the rectifier circuit and the charge accumulation circuit and connected in parallel to each of the rectifier circuit and the charge accumulation circuit;
   a processor to generate a control signal for controlling a switching operation of the first and second switching elements;
   a switch drive circuit to apply a drive signal generated on a basis of the control signal output from the processor, to cause the first and second switching elements to perform an ON/OFF operation exclusively to each other;

a first current detector to detect a first current flowing into and out of the switch circuit; and a second current detector to detect a second current flowing into and out of the inverter, wherein a detector of the first current detector is disposed between the rectifier circuit and the switch circuit, and the processor detects a current flowing through the switch circuit, on a basis of a difference value between a detection value of the first current and a detection value of the second current.

2. The AC/DC converter according to claim 1, wherein the processor determines, based on the difference value between the detection value of the first current and the detection value of the second current, whether or not a current flowing through the switch circuit is an overcurrent, and outputs a stop signal to the switch drive circuit when an overcurrent is detected, and the switch drive circuit stops a switching operation of the first and second switching elements when the switch drive circuit receives a stop signal.

3. An electric motor drive device comprising:
the AC/DC converter according to claim 2; and
the inverter to which the DC voltage output from the AC/DC converter is applied.

4. A refrigeration cycle device comprising:
the electric motor drive device according to claim 3; and
a compressor including an electric motor to be driven by the electric motor drive device.

5. An electric motor drive device comprising:
the AC/DC converter according to claim 1; and
the inverter to which the DC voltage output from the AC/DC converter is applied.

6. A refrigeration cycle device comprising:
the electric motor drive device according to claim 5; and
a compressor including an electric motor to be driven by the electric motor drive device.

7. An alternating current/direct current (AC/DC) converter for converting an input AC voltage into a DC voltage and applying the DC voltage to an inverter that drives an electric motor, the AC/DC converter comprising:
a rectifier circuit to rectify the AC voltage;
a charge accumulation circuit including first and second capacitors connected in series;
a switch circuit including first and second switching elements connected in series,
wherein the switch circuit is disposed between the rectifier circuit and the charge accumulation circuit, and
wherein a series circuit formed by the first and second switching elements is connected in parallel to each of the rectifier circuit and the charge accumulation circuit, and
wherein a first connection point between the first switching element and the second switching element constituting a midpoint of the series circuit is continuously connected to a connection point between the first capacitor and the second capacitor that constitutes a midpoint of the charge accumulation circuit;

first and second backflow prevention elements to prevent backflow of a charge accumulated in the charge accumulation circuit, the first and second backflow prevention elements being disposed between the switch circuit and the charge accumulation circuit;

a processor to generate a control signal for controlling a switching operation of the first and second switching elements;

a switch drive circuit to apply a drive signal generated on a basis of the control signal output from the processor, to cause the first and second switching elements to perform an ON/OFF operation exclusively to each other;

a first current detection unit to detect a first current flowing into and out of the switch circuit; and a second current detection unit to detect a second current flowing into and out of the inverter, wherein the first current detection unit includes:
a first current detector capable of detecting a current flowing through the first switching element, in the first current;
a second current detector capable of detecting a current flowing through the second switching element, in the first current; and
a third current detector disposed between the rectifier circuit and the switch circuit, the third current detector being able to detect the first current, when
a current value of the first current is defined as Idc,
an effective value of a maximum current that can flow in the first and second current detectors is defined as IrmsMAX, and
an ON time per control cycle of the first and second switching elements is defined as Ton and an OFF time is defined as Toff,
then a relationship of Formula (1) below is satisfied, the third current detector is selected as a detector of the first current detection unit when at least the third current detector satisfies a relationship of Formula (2) below, when the third current detector does not satisfy the relationship of the Formula (2) below and the first and second current detectors satisfy the relationship of the Formula (1), the first and second current detectors are selected as detectors of the first current detection unit, the Formula (1) is: $Idc \geq IrmsMAX \geq \sqrt{\{Ton/(Ton+Toff)\}} \times Idc$; and the Formula (2) is: $IrmsMAX \geq Idc$.

8. An electric motor drive device comprising:
the AC/DC converter according to claim 7; and
the inverter to which the DC voltage output from the AC/DC converter is applied.

9. A refrigeration cycle device comprising:
the electric motor drive device according to claim 8; and
a compressor including an electric motor to be driven by the electric motor drive device.

* * * * *